(12) United States Patent
Hartshorn

(10) Patent No.: US 12,353,529 B1
(45) Date of Patent: Jul. 8, 2025

(54) AUTHENTICATION SYSTEMS AND METHODS

(71) Applicant: United Services Automobile Association (USAA), San Antonio, TX (US)

(72) Inventor: Joel S. Hartshorn, Port Orchard, WA (US)

(73) Assignee: United Services Automobile Association (USAA), San Antonio, TX (US)

( * ) Notice: Subject to any disclaimer, the term of this patent is extended or adjusted under 35 U.S.C. 154(b) by 263 days.

(21) Appl. No.: 17/955,973

(22) Filed: Sep. 29, 2022

Related U.S. Application Data

(60) Provisional application No. 63/328,398, filed on Apr. 7, 2022, provisional application No. 63/250,000, filed on Sep. 29, 2021, provisional application No. 63/249,997, filed on Sep. 29, 2021, provisional application No. 63/249,987, filed on Sep. 29, 2021, provisional application No. 63/250,008, filed on Sep. 29, 2021.

(51) Int. Cl.
 *G06F 21/32* (2013.01)
(52) U.S. Cl.
 CPC .................................... *G06F 21/32* (2013.01)
(58) Field of Classification Search
 CPC ....................................................... G06F 21/32
 See application file for complete search history.

(56) References Cited

U.S. PATENT DOCUMENTS

| 8,789,194 | B2 * | 7/2014 | Toole | G06F 21/316 |
| | | | | 726/25 |
| 9,424,419 | B1 * | 8/2016 | Kruse | G06F 21/31 |
| 9,667,611 | B1 * | 5/2017 | Friedman | G06F 21/32 |
| 10,581,847 | B1 * | 3/2020 | Sun | H04L 63/083 |
| 10,715,514 | B1 * | 7/2020 | Threlkeld | H04L 63/0807 |
| 10,754,936 | B1 | 8/2020 | Hawes et al. | |
| 11,296,885 | B2 * | 4/2022 | Everson | H04L 9/3228 |
| 11,463,426 | B1 * | 10/2022 | Wheeler | H04L 63/102 |
| 11,537,706 | B1 * | 12/2022 | Sharifi Mehr | G06F 21/33 |
| 12,086,233 | B2 * | 9/2024 | Khaund | G06F 21/604 |
| 2013/0014248 | A1 | 1/2013 | McLaughlin et al. | |
| 2014/0189808 | A1 * | 7/2014 | Mahaffey | G06F 21/6245 |
| | | | | 726/4 |

(Continued)

OTHER PUBLICATIONS

U.S. Appl. No. 17/956,491, filed Sep. 29, 2022, Mark Paxman Warnick.

(Continued)

*Primary Examiner* — Techane Gergiso
(74) *Attorney, Agent, or Firm* — Fletcher Yoder, P.C.

(57) ABSTRACT

An authentication system includes one or more processors and a memory storing instructions executable by the one or more processors to cause the one or more processors to receive a first request for an electronic data action from a user device associated with a user and to select one or more first authentication factors from a plurality of available authentication factors based on a rotation schedule, a random selection, a prior location of the user, a prior activity of the user, a presence of an auxiliary device in a vicinity of the user device, or any combination thereof.

18 Claims, 4 Drawing Sheets

(56) References Cited

U.S. PATENT DOCUMENTS

2014/0298041 A1* 10/2014 Consalus .............. G06F 21/602
                                                            713/193
2016/0357955 A1* 12/2016 Kruse ..................... G06F 21/31
2022/0141029 A1*  5/2022 Dahmen .............. H04L 9/3231
                                                            713/176

OTHER PUBLICATIONS

U.S. Appl. No. 17/955,192, filed Sep. 28, 2022, John S. Hartshorn.
U.S. Appl. No. 17/955,199, filed Sep. 28, 2022, John S. Hartshorn.

* cited by examiner

AUTHENTICATION SYSTEMS AND METHODS

CROSS-REFERENCE TO RELATED APPLICATIONS

The present application claims priority to and the benefit of U.S. Provisional Application No. 63/328,398, entitled "AUTHENTICATION SYSTEMS AND METHODS" and filed on Apr. 7, 2022; U.S. Provisional Application No. 63/249,987, entitled "SYSTEMS AND METHODS FOR PERSONALIZED FOG NETWORKS" and filed on Sep. 29, 2021; U.S. Provisional Application No. 63/249,997, entitled "SYSTEMS AND METHODS FOR PERSONALIZED FOG NETWORKS" and filed on Sep. 29, 2021; U.S. Provisional Application No. 63/250,000, entitled "DECENTRALIZED IDENTITY" and filed on Sep. 29, 2021; and U.S. Provisional Application No. 63/250,008, entitled "SYSTEMS AND METHODS FOR DISTRIBUTED IDENTITY SERVICES" and filed on Sep. 29, 2021. These disclosures are incorporated by reference herein in their entirety for all purposes.

BACKGROUND

The present disclosure relates generally to authentication systems and methods.

Authentication systems and methods may be utilized to confirm or to verify an identity of a user. For example, a user of a computing device may attempt to log into a back-end system, and authentication systems and methods may be utilized to ensure that the user is authorized to log into the back-end system. In some cases, authentication is achieved based on credentials input by the user (e.g., username and password).

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statement are to be read in this light, and not as admission of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an authentication system includes one or more processors and a memory storing instructions executable by the one or more processors to cause the one or more processors to receive a first request for an electronic data action from a user device associated with a user and to select one or more first authentication factors from multiple available authentication factors based on a rotation schedule, a random selection, a prior location of the user, a prior activity of the user, a presence of an auxiliary device in a vicinity of the user device, or any combination thereof. The instructions are executable by the one or more processors to cause the one or more processors to instruct output of one or more first prompts to facilitate input of the one or more first authentication factors, to receive one or more first inputs indicative of the one or more first authentication factors, to authenticate the user based on the one or more first inputs, and to grant the first request in response to authenticating the user.

In one embodiment, an authentication system includes one or more processors and a memory storing instructions executable by the one or more processors to cause the one or more processors to receive a first request for an electronic data action from a user device associated with a user and to select one or more first authentication factors from multiple available authentication factors based on a rotation schedule. The instructions are executable by the one or more processors to cause the one or more processors to instruct output of one or more first prompts to facilitate input of the one or more first authentication factors, receive one or more first inputs indicative of the one or more first authentication factors, authenticate the user based on the one or more first inputs, and grant the first request in response to authenticating the user.

In one embodiment, a method of operating an authentication system includes receiving, at one or more processors, a first request for an electronic data action from a user device associated with a user. The method also includes selecting, using the one or more processors, one or more first authentication factors from multiple available authentication factors based on a rotation schedule, a random selection, a prior location of the user, a prior activity of the user, or any combination thereof. The method further includes instructing, using the one or more processors, output of one or more first prompts to facilitate input of the one or more first authentication factors. The method further includes receiving, at the one or more processors, one or more first inputs indicative of the one or more first authentication factors. The method further includes authenticating, using the one or more processors, the user based on the one or more first inputs. The method further includes granting, using the one or more processors, the first request in response to authenticating the user.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to authentication systems and methods, and more particularly, to improved authentication systems and methods that use different credentials at different times (e.g., based on a schedule, preference, random selection, and/or prior locations/activities/conditions/behaviors of a user). The present embodiments address post-Internet issues that have arisen with respect to protecting against unauthorized access/modification to electronic data and with respect to inefficiencies of traditional authentication techniques that have become overly cumbersome (e.g., with a heavy burden on the user to provide multiple keyed inputs) in efforts to address more sophisticated threats. Furthermore, the present embodiments take advantage of multiple forms of credentials that may be generated for the user, such as credentials based on biometric data, location data, image data, and the like, to provide a rotation of many different credentials at different times. In some embodiments, the credentials may include decentralized identifiers (DID) stored on a blockchain to provide efficient, secure authentication with a rotation of many different credentials at different times.

Figure 1:
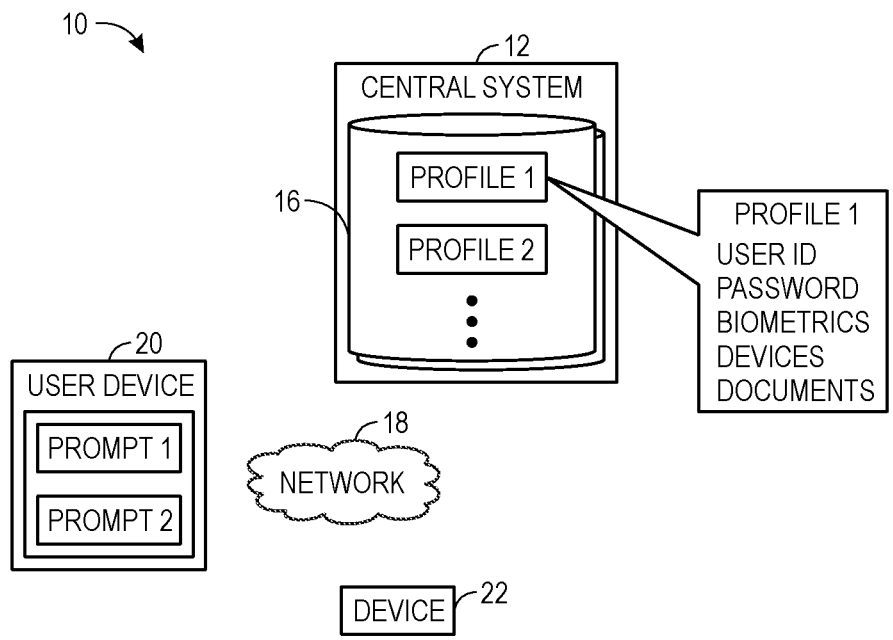
FIG. 1 is a schematic diagram of an authentication system, in accordance with an embodiment of the present disclosure.

With the foregoing in mind, FIG. 1 is a schematic diagram of an embodiment of an authentication system 10. The authentication system 10 includes a central system 12 (e.g., processing system; computing system) that includes and/or has access to a database 16 (e.g., data repository). The central system 12 may communicate over a network 18 with multiple user devices, including a user device 20. The user device 20 may include a single device, such as a mobile phone or a personal laptop computer. In some cases, the user device 20 may be a system of user devices that cooperate to carry out the operations described as being completed by the user device 20 (e.g., the user may complete certain authentication steps via the user device 20 to access electronic data on the personal laptop computer).

In any case, the authentication system 10 may enable input of one or more credentials (e.g., factors, inputs) at the user device 20 and then may perform electronic data actions in response to receipt of the one or more credentials from the user device 20. For example, the authentication system 10 may be a multi-factor authentication system that prompts a user to input multiple credentials (e.g., biometric data and an image) at the user device 20 and then grants access to electronic data via the user device 20 or another device in response to receipt of the one or more credentials from the user device 20. The electronic data may include financial records of the user, and the electronic data actions may include granting access to view the financial records via the user device 20 or another device, modifying the financial records of the user, or the like. However, the authentication system 10 may perform any of a variety of electronic data actions upon authenticating that the user requesting the electronic data actions has sufficient rights for performance of the electronic data actions.

In operation, the user device 20 may receive from the user an input of a request for an electronic data action. For example, the user may open an application on the user device 20, which may act as the input of the request for the electronic data action. As another example, the user may open an application on the user device 20 and provide a keyed input (e.g., click on a virtual button displayed on a display screen of the user device 20), which may act as the input of the request for the electronic data action. In any case, the user device 20 may communicate the request to the central system 12. The user device 20 may also communicate information useful for authentication, such as a user identifier of the user and/or a device identifier of the user device 20 that operates as primary authentication information and/or enables the central system 12 to access a corresponding profile from the database 16. In response to receipt of the request and/or the information, the central system 12 may instruct output of one or more prompts via a graphical user interface shown via a display screen of the user device 20.

The one or more prompts and/or the factors used for authentication may vary from request to request and/or over time. Thus, a first request from the user may result in a first prompt(s), and a second request from the user may result in a second prompt(s), and so on. In some embodiments, the central system 12 may utilize one or more rotation schedule(s) such that the user may receive the first prompt(s) over a first time period (e.g., 12 or 24 hours), but then may receive the second prompt(s) over a second time period (e.g., the following 12 or 24 hours). In some embodiments, the central system 12 may utilize one or more rotation schedule(s) such that all users may receive the first prompt(s) over one time period, but then may receive the second prompt(s) over the second time period. In some embodiments, a first subset of users may receive the first prompt(s) over a first time period (e.g., 12 or 24 hours) and the second prompt(s) over a second time period (e.g., the following 12 or 24 hours), while a second subset of users may receive the second prompt(s) over the first time period and the first prompt(s) over the second time period. It should be appreciated that the one or more prompts and/or factors used for authentication may refer to specific prompts and/or factors (e.g., use your heart rate monitor to provide a heart rate signal) or refer to more general category/types of prompts and/or factors (e.g., provide a physiological signal). Thus, two users may receive the same prompt (e.g., provide a physiological signal), but the two users may provide different information for the authentication (e.g., one user provides a heart rate signal, while one user provides a breath parameter signal). In some cases, the rotation schedule may call for one general category/type of prompt and/or factor at each particular time, such as a recent location at one particular time. Then, the central system 12 may determine a specific prompt and/or factor within the general/category/type based on information gathered via monitoring, such as recent locations of the user (e.g., the prompt will be to facilitate input of the location of the dentist office at 10 am or the location of the school at 3 pm depending on the recent locations of the user).

Additionally, in some embodiments, the one or more prompts may be personalized or unique to the user based on the information stored in the corresponding profile and/or other factors, such as prior locations of the user, prior activities of the user, and/or prior conditions/behaviors of the user (e.g., within the last time period, such as 12, 24, or more hours). In some embodiments, the corresponding profile may include information related to baseline physiological signal(s) for the user (e.g., a baseline heart rate signal, a baseline breath parameter signal for the user), biometric feature(s) of the user and/or other person(s) associated with the user, device identifier(s) of a device(s) associated with the user, documents associated with the user, photographs associated with the user, prior locations/activities/conditions/behaviors of the user, and so on.

In some embodiments, the one or more prompts may instruct the user to use an auxiliary device 22 (e.g., sensor, camera) to collect data that may be used to authenticate the user. For example, when the information stored in the corresponding profile includes a baseline heart rate signal of the user and/or upon receipt of an indication that a heart rate monitor is in proximity of the user device 20, the central system 12 may prompt the user to use the heart rate monitor. Then, the central system 12 may receive signals from the heart rate monitor (e.g., directly or via the user device 20), compare the signals to the baseline heart rate signal, and use the signals as one authentication factor to authenticate the user upon determining that the signals correspond to the baseline heart rate signal.

It should be appreciated that the central system 12 may determine that the auxiliary device 22 is in proximity of the user device 20 and/or accessible for use to authenticate the user in various different ways, such as by determining that the auxiliary device 22 is incorporated into the user device 20 based on the device identifier or other characteristics of the user device 20 communicated to the central system 12, due to receipt of an indication that the auxiliary device 22 has established short-range communications (e.g., Bluetooth) with the user device 20, due to receipt of respective location data from respective location sensors of the auxiliary device 22 and the user device 20, and/or due to receipt of data (e.g., physiological signals; images) from the auxiliary device 22 at the user device 20 and/or the central system 12 via the network 18.

In some embodiments, the presence or the absence of the auxiliary device 22 in a vicinity of the user device 20 may also operate as an authentication factor to authenticate the user. For example, the presence of the auxiliary device 22 (e.g., presence of the heart rate monitor alone even without the signal that indicates a current heart rate) may be one authentication factor to authenticate the user. Similarly, the absence of the auxiliary device 22 alone may cause the central system 12 to not authenticate the user (e.g., the central system 12 may set this as a requirement for authentication, due to preferences input by the user and/or due to analysis of prior behavior of the user, such as that the auxiliary device 22 with a particular device identifier has always been present upon receipt of the request from the user) and/or may cause the central system 12 to request additional authentication factors (e.g., cause a more challenging authentication process). The auxiliary device 22 may be any of a variety of sensors, including biometric sensors (e.g., that collect physiological data, such as fingerprints, breathing rate and other breath parameters, body temperature) and/or environmental sensors (e.g., that collect environmental data, such as air temperature, air composition).

The auxiliary device 22 may be a camera, and the one or more prompts may instruct the user to operate the camera to capture one or more images of a surrounding environment (e.g., a flooring of their current location), a facial feature and/or body part (e.g., a left side face profile, a right hand; of the user, a family member of the user, a roommate of the user, a pet of the user, and/or multiple beings together, such as the user and the family member), a document (e.g., a photo identification card, a library card, a social security card, a utility bill), and/or a combination thereof (e.g., a face of the user with the social security card). Then, the central system 12 may receive the one or more images from the camera, compare the one or more images to stored images, and use the one or more images as authentication factor(s) to authenticate the user upon determining that the one or more images correspond to the stored images.

As noted herein, the central system 12 may store baseline data that is then compared to the data received via the auxiliary device 22 and/or the user device 20 to authenticate the user. For example, the central system 12 may store a stored photograph of a library card of the user and/or a stored library card number of the library card of the user. Then, upon receipt of a current photograph of a library card via the auxiliary device 22 and/or the user device 20, the central system 12 may compare the current photograph to the stored photograph and/or compare a number of the library card to the stored library card number. Upon detecting a match, the central system 12 may use the current photograph of the library card as an authentication factor to authenticate the user. In some embodiments, the central system may compare multiple elements in a single photograph to the stored photograph(s), as matching the library card in the current photograph to the stored photograph and matching a background features (e.g., wallpaper, flooring, countertop material) in the current photograph to the stored photograph(s) provides two separate authentication factors and/or may cause the central system 12 to request fewer authentication factors (e.g., cause a less challenging authentication process; remove a request for another authentication factor). It should also be appreciated that the central system 12 may instruct control of the auxiliary device 22, such as via communication with the auxiliary device 22 via the network. For example, the central system 12 may instruct control of the auxiliary device 22 to capture biometric data and/or images for use in the authentication process (e.g., in response to receive of the request for the electronic data action; in response to establishing communication with the auxiliary device 22).

In some embodiments, the one or more prompts may instruct the user to provided keyed inputs (e.g., typed inputs), verbal inputs (e.g., spoken inputs), touch inputs (e.g., via a touchscreen of the user device 20), and/or similar responsive inputs (e.g., request for photos taken with and/or stored on the user device 20). For example, the central system 12 may receive a location input that indicates that the user visited a dentist's office earlier in the day, such as via the dentist's office submitting a bill to an insurance company, via the user device 20 connecting to a new wireless network at the dentist's office, via location tracking of the user device 20, and/or via accessing a calendar entry stored in a cloud storage. The central system 12 may store the location input as an electronic record in the database 16. Then, in some such cases, the one or more prompts may instruct the user to provide a responsive input to identify a location that the user visited earlier in the day. For example, the user be presented with three location options, such as (1) dentist office; (2) grocery store; and (3) school, and the user may provide the responsive input to identify the location that the user visited earlier in the day. It should be appreciated that the central system 12 may also determine other locations that the user did not visit based on other location inputs (e.g., location tracking), and provide these as the other location options. Then, the central system 12 may compare the responsive input the electronic record in the database 16, and upon detecting a match, the central system 12 may use the responsive input as an authentication factor to authenticate the user.

As noted herein, the central system 12 may vary and/or rotate the one or more prompts to obtain different factors at different times. This may provide additional security for the user, as it may be more difficult for any person or system other than the user with the user device 20 and/or the auxiliary device 22 to be authenticated to initiate performance of the requested electronic data actions. The central system 12 may vary the one or more prompts (and the factor(s) needed to complete the authentication of the user) based on a rotation schedule (e.g., a first type of biometric data and an image of a first type of document on a first day of the week, a second type of biometric data and an image of a second type of document on a second day of the week, and so on). The rotation schedule may be the same for all users, certain subsets of users, or unique to each user (e.g., another user is instructed to input the second type of biometric data and an image of the second type of document on the first day of the week, and the first type of biometric data and an image of the first type of document on the second day of the week).

In some embodiments, the user may select or establish the rotation schedule during a registration process. For example, the user may be presented with multiple different options for authentication factors (e.g., heart rate, images, documents, locations), and the user may arrange the authentication factors into multiple groups. Additionally or alternatively, the user may associate each of the multiple groups with different times or otherwise set up a rotation for the multiple groups. In this way, the central system 12 may provide different prompts at different times, but in accordance with preferences of the user. The rotation schedule may be stored, such as in the database 16.

In some embodiments, the central system 12 may vary the one or more prompts via random selection (e.g., randomly selected upon each request to initiate performance of the electronic data actions). Additionally or alternatively, the central system 12 may vary the one or more prompts based on the prior locations of the user, prior activities of the user, and/or prior conditions/behaviors of the user. For example, the one or more prompts may ask the user to input an indication of one or more prior locations of the user (e.g., dentist office, school), one or more prior activities of the user (e.g., periods of exercise, periods of sleep, periods of eating), and/or prior conditions/behaviors of the user (e.g., medications, illness). The central system 12 may vary the one or more prompts based on a combination of the rotation schedule, preferences, random selection, and/or locations/ activities/conditions/behavior, such as one prompt and factor being based on the preferences of the user and one prompt and factor being based on random selection for authenticating the user during a current authentication process. Thus, the variability in the authentication may be automated, planned, random, dynamic, and/or based on at least some manual inputs (e.g., preferences).

In some embodiments, the user may have no direct or indirect control over the rotation of the one or more prompts and/or factors used for authentication of the user. However, in some embodiments, the user may have no direct control over the rotation of the one or more prompts and/or factors used for authentication of the user, but have some indirect control via their locations/activities/conditions/behaviors. When the user has direct and/or indirect control, the central system 12 may provide reminders (e.g., via the display screen of the user device 20) to (1) update and/or add to the factors used for authentication of the user (e.g., add more physiological signals; visit more atypical locations); and/or to (2) update the rotation schedule for the factors used for the authentication of the user. The central system 12 may provide the reminders periodically (e.g., daily, weekly, monthly, annually) and/or in response to the user reaching or exceeding a threshold number of authentication attempts and/or requests to initiate performance of the requested electronic data actions. In some embodiments, the threshold may vary based on a number of available factors for authentication (e.g., the threshold is lower if there is a lower number of available factors and is higher if there is a higher number of available factors).

Figure 2:
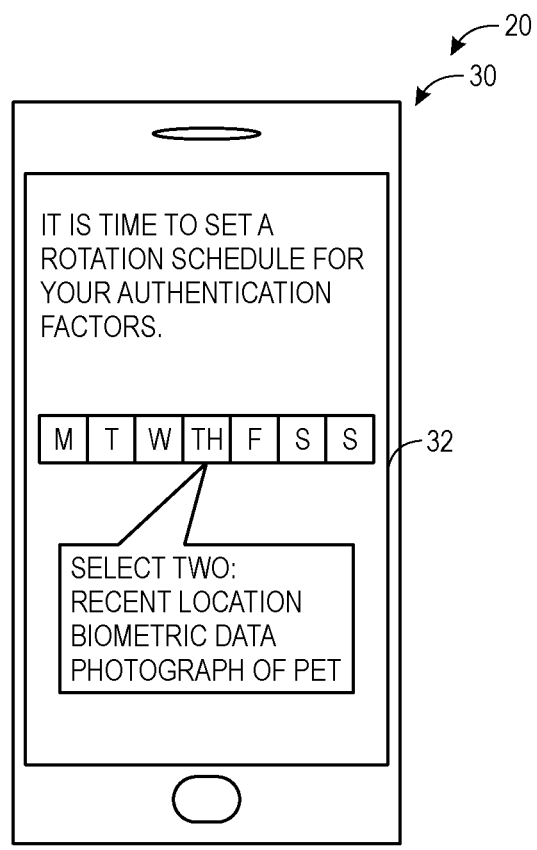
FIG. 2 is a schematic diagram of a graphical user interface (GUI) on a display screen of a user device, wherein the GUI facilitates entry of preferences for authentication factors, in accordance with an embodiment of the present disclosure.

FIG. 2 is a schematic diagram of a graphical user interface (GUI) 30 on a display screen 32 of the user device 20, wherein the GUI 30 facilitates entry of preferences for authentication factors, in accordance with an embodiment of the present disclosure. As shown, the GUI 30 may prompt the user to set a rotation schedule for the factors used for authentication of the user, and the rotation schedule may include different factors for different days of the weeks. The central system 12 may instruct output of the GUI 30, and the central system 12 may limit the factors that are available for use on certain days to thereby facilitate variation day to day. For example, the central system 12 may enable the user to select two factors from a first list of options (e.g., recent location, biometric data, and photograph of a pet) for one day or other time period, and may enable the user to select two factors from a second list of options (e.g., document, environmental sensor data, and heart rate signal) for another day or time period. The two factors are merely exemplary, and any number of factors may be selected from any number of options.

It should be appreciated that the GUI 30 is merely representative of information and selectable options that may be presented to the user. Indeed, the central system 12 may instruct output of any of a variety of information, such as any of the information and/or data disclosed herein. For example, the central system 12 may instruct output of indications of available factors based on information stored in the corresponding profile, other factors that can be used upon the user providing information for the corresponding profile, a current type of rotation (e.g., per a schedule, per random selection), a recommendation to change and/or update the factors, a recommendation to change and/or update the rotation schedule, the one or more prompts for the factors for a current authentication process, and the like.

Figure 3:
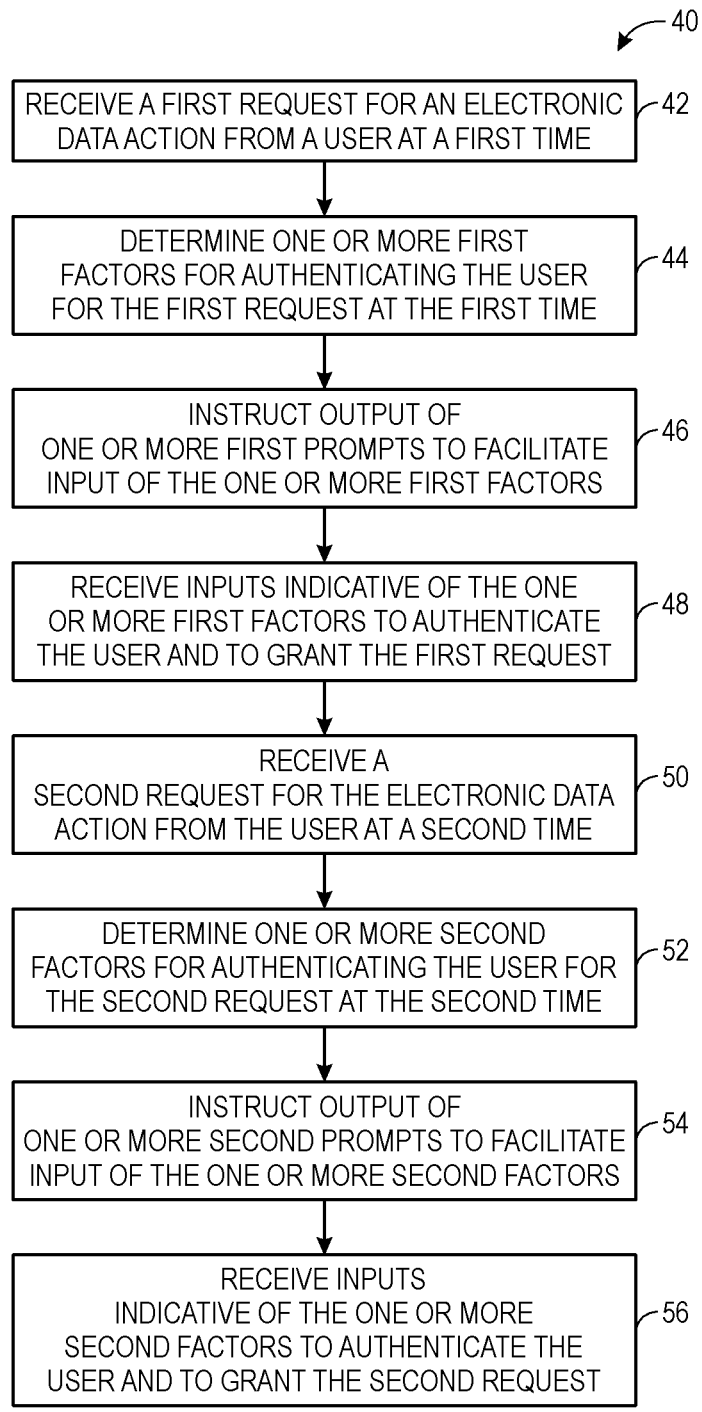
FIG. 3 is a flow diagram of a method of using an authentication system, in accordance with an embodiment of the present disclosure.

FIG. 3 is a flow diagram of a method 40 of using an authentication system, in accordance with an embodiment of the present disclosure. The following description of the method 40 is described as being performed by a processing system (e.g., the central system 12), but it should be noted that any suitable processor-based device or system may be specially programmed to perform any of the methods described herein. Moreover, although the following description of the method 40 is described as including certain steps performed in a particular order, it should be understood that the steps of the method 40 may be performed in any suitable order, that certain steps may be omitted, and/or that certain steps may be added.

In step 42, the processing system receives a first request for an electronic data action from a user at a first time. For example, the user may open an application on a user device, such as a mobile phone or a personal computer, to make the first request for the electronic data action. In step 44, the processing system may determine one or more first factors for authenticating the user for the first request at the first time, wherein the one or more first factors for authenticating the user are sufficient for the processing system to grant the first request for the electronic data action (e.g., grant access to an account, such as a bank account, via the user device or another device).

The processing system may determine the one or more first factors for authenticating the user based on a rotation schedule, preferences of the user, random selection, and/or prior locations/activities/conditions/behaviors of the user. For example, during a registration process and/or at some other time, the user may have set their rotation schedule to include one or more particular factors (e.g., biometric data and a recent location) on a day of the week that encompasses the first time. Then, the processing system may determine the one or more first factors to include the one or more particular factors. In some such cases, as a more specific example, the processing system may determine the one or more first factors to include the biometric data of a fingerprint based on the user device being identified as having a fingerprint scanner or the user otherwise being in a vicinity of the fingerprint scanner, and/or the processing system may determine the one or more first factors to include the recent location of a school based on tracking data of the user device and/or other location data for the user. Thus, the processing system may set specific or general factors (e.g., any biometric data or fingerprint data; any recent location or the school) and may take multiple data inputs into account to set the specific or general factors.

In step 46, the processing system may instruct output of one or more first prompts to facilitate input of the one or more first factors. The processing system may output specific or general prompts to obtain the set specific or general factors. For example, the processing system may prompt the user to input any biometric data or any recent location of the user within a prior time period (e.g., 12, 24, or more hours). The processing system may prompt the user to use an auxiliary device, or the processing system may instruct the auxiliary device to operate in a manner that provides the one or more first factors to the processing system (e.g., a camera to capture and communicate an image of an environment around the user device and the user).

In step 48, the processing system may receive inputs indicative of the one or more first factors, such as from the user device and/or the auxiliary device. The processing system may compare the one or more first factors to a corresponding profile of the user in a database. Upon detecting a match/confirming accuracy of the one or more first factors, the processing system may authenticate the user and grant the first request.

In step 50, the processing system receives a second request for the electronic data action (or another electronic data action) from the user at the first time. In step 52, the processing system may determine one or more second factors for authenticating the user for the second request at the second time, wherein the one or more second factors for authenticating the user are sufficient for the processing system to grant the second request for the electronic data action (e.g., or another electronic data action; grant access to the account, such as the bank account, via the user device or another device).

At least one of the one or more second factors may be different than at least one of the one or more first factors, as this provides enhanced security and variable authentication steps. The processing system may determine the one or more second factors for authenticating the user based on a rotation schedule, preferences of the user, random selection, and/or prior locations/activities/conditions/behaviors of the user. For example, during the registration process and/or at some other time, the user may have set their rotation schedule to include one or more particular factors (e.g., an account number and a physiological signal) on a day of the week that encompasses the second time. Then, the processing system may determine the one or more second factors to include the one or more particular factors. In some such cases, as a more specific example, the processing system may determine the one or more second factors to include a utility services account number for a residence of the user based on the user device being identified as being at the residence of the user, and/or the processing system may determine the one or more second factors to include a heart rate signal based on a heart rate sensor being identified as being in a vicinity of the user device. Thus, the processing system may set specific or general factors (e.g., any account number or the utility services account number; any physiological signal or a heart rate signal) and may take multiple data inputs into account to set the specific or general factors.

In step 54, the processing system may instruct output of one or more second prompts to facilitate input of the one or more second factors. The processing system may output specific or general prompts to obtain the set specific or general factors. For example, the processing system may prompt the user to input any account number or any physiological signal. The processing system may prompt the user to use an auxiliary device, or the processing system may instruct the auxiliary device to operate in a manner that provides the one or more second factors to the processing system (e.g., the heart rate sensor to capture and communicate the heart rate signal).

In step 56, the processing system may receive inputs indicative of the one or more second factors, such as from the user device and/or the auxiliary device. The processing system may compare the one or more second factors to the corresponding profile of the user in the database. Upon detecting a match/confirming accuracy of the one or more second factors, the processing system may authenticate the user and grant the second request. The first request and the second request may relate to the same electronic data action, but different factors at different times may be used to authenticate the user for the same electronic data action. However, it should be appreciated that the first request and the second request may instead relate to different electronic data actions, and the different factors at the different times may be used to authenticate the user for the different electronic data actions.

Figure 4:
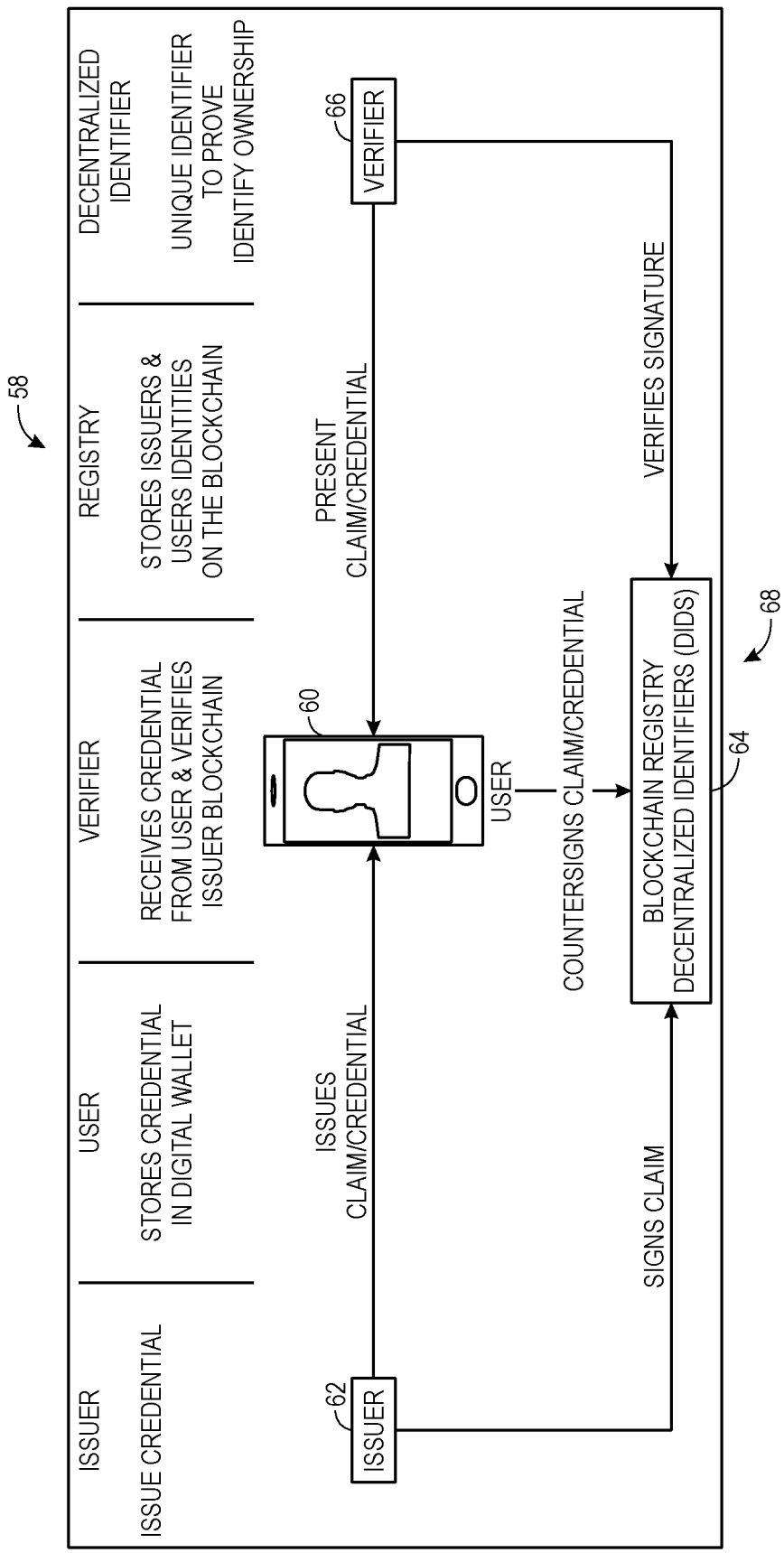
FIG. 4 is a schematic diagram of an authentication system that includes decentralized identifiers stored on a blockchain, in accordance with an embodiment of the present disclosure.

Variable authentication factors may be implemented with decentralized identifiers (DIDs). DIDs are applicable to various digital interactions that utilize identity and authentication to provide authorization and access, and DIDs enable increased authentication through real-time verifiable credentials from multiple trusted issuers. With the foregoing in mind, FIG. 4 is a schematic diagram of an authentication system 58 that includes DIDs stored on a blockchain, in accordance with an embodiment of the present disclosure.

As shown, a user may utilize a user device 60 to communicate with an issuer system 62, which may be operated by an issuer entity, such as a financial services company, an insurance company, a government agency, or other trusted entity or institution. The issuer system 62 may issue credentials to the user, such as an address issued by a government postal agency, a utility account number issued by a utility entity, a photograph of a diploma issued by a university, a heart rate signal record from a hospital, or the like. The issuer system 62 may issue credentials to the user in other ways, such as via a manual process in which the user brings an item (e.g., a document, a photograph of a family member or pet) to an issuer member (e.g., employee of the issuer entity) and/or obtains data (e.g., physiological signals; biometric data) in front of the issuer member. The issuer member may confirm the identity of the user and the validity of the item/data, and then issue the credential for the item/data.

In any case, the credential may be stored on a blockchain registry 64 (e.g., blockchains; distributed ledgers) to thereby become a DID (e.g., electronic data or document stored on the blockchain registry 64 rather than only on a single, central system, such as the issuer system 62). Thus, the credential may be an immutable, secure record that can be verified to have authentic, digital signatures from the issuer and the user. The credential may be considered to be a verifiable credential, as the credential is verifiable by a verifier system 66 that has access to the blockchain registry 64 and cryptographic keys corresponding to the digital signatures.

The user may store the credential in a wallet (e.g., digital wallet and/or hard wallet), as well as a private key corresponding to a public cryptographic key. At some later time, the user may make a request for an electronic data action through the verifier system 66, which may carry out the electronic data action upon authenticating the user. For example, the verifier system 66 may be operated by a verifier entity, such as a financial services company, an insurance company, a government agency, or other entity or institution that holds/has access to electronic data. Upon receipt of the request at the verifier system 66, the verifier system 66 may locate the credential on the blockchain registry 64 and confirm the digital signatures before granting the request for the electronic data action.

The verifier system 66 may implement the rotation of the credentials, such that different credentials are used at different times to authenticate the user. The verifier system 66 may implement the rotation of the credentials using any of the techniques disclosed herein. In this way, the authentication process may be dynamic and variable to provide enhanced security, as well as efficient due to use of the credentials stored on the blockchain registry 64 (e.g., the user provides a key from their wallet to enable access to a factor for the authentication process, rather than the user providing numerous other keyed or complex inputs). The blockchain registry 64 and associated computing systems may be part of a blockchain system 68 (e.g., distributed ledger systems).

Figure 5:
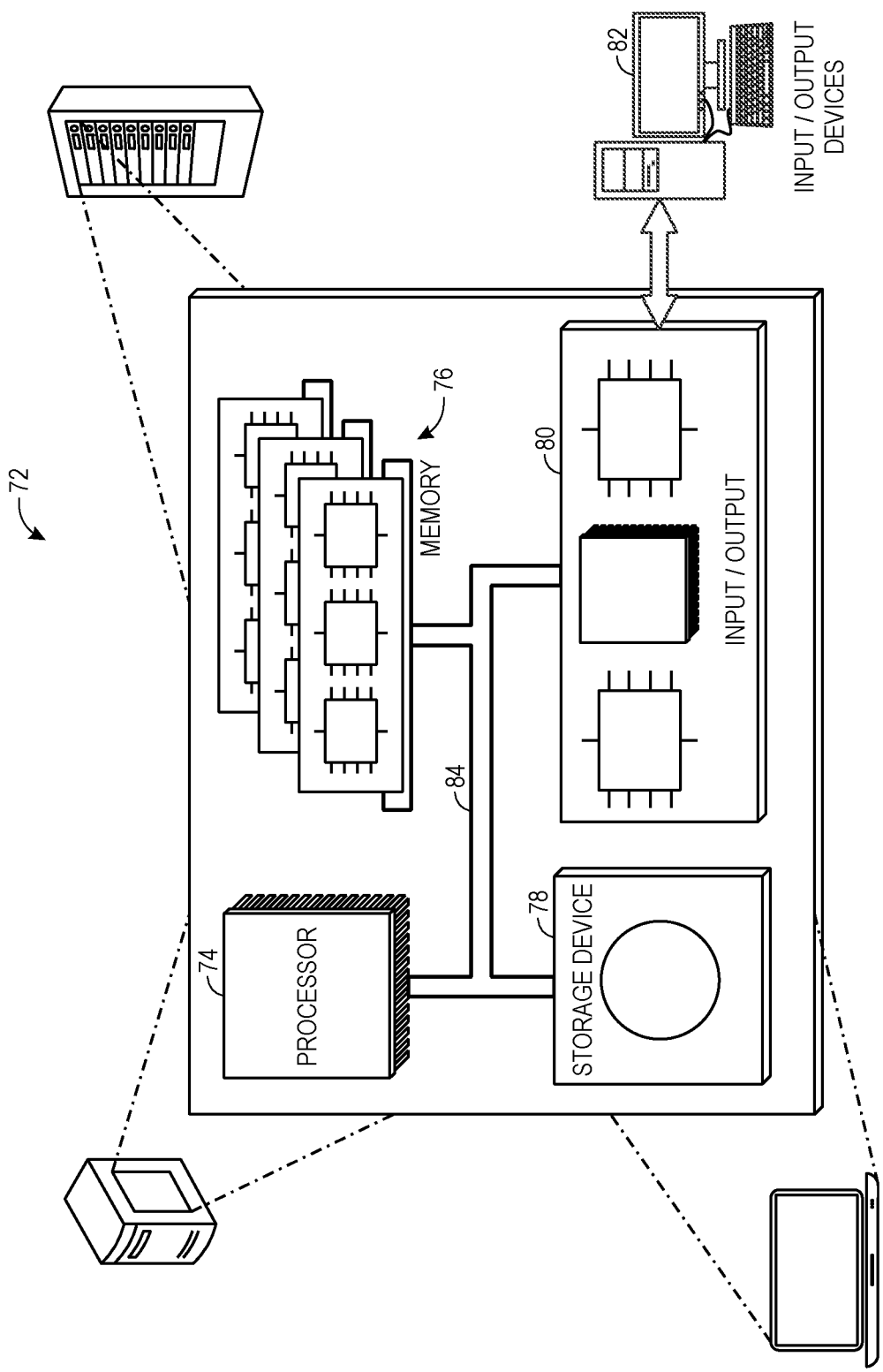
FIG. 5 is a computing system, in accordance with an embodiment of the present disclosure.

FIG. 5 illustrates a block diagram of a system 72, in accordance with the embodiments described herein. The system 72 may be used for one or more of the operations described with respect to the various embodiments discussed herein. For example, the system 72 may be included, at least in part, in one or more of user device(s) 20, the auxiliary device 22, the central system 12, the blockchain system 68, or other computing device(s) described herein. The system 72 may include one or more processors 74, a memory 76, one or more storage devices 78, and one or more input/output (I/O) devices 82 controllable through one or more I/O interfaces 80. The various components 74, 76, 78, 80, or 82 may be interconnected through at least one system bus 84, which may enable the transfer of data between the various modules and components of the system 72.

The processor(s) 74 may be configured to process instructions for execution within the system 72. The processor(s) 74 may include single-threaded processor(s), multi-threaded processor(s), or both. The processor(s) 74 may be configured to process instructions stored in the memory 76 or on the storage device(s) 78. The processor(s) 74 may include hardware-based processor(s) each including one or more cores. The processor(s) 74 may include general purpose processor(s), special purpose processor(s), or both.

The memory 76 may store information within the system 72. In certain embodiments, the memory 76 includes one or more computer-readable media. The memory 76 may include any suitable number of volatile memory units and/or non-volatile memory units. The memory 76 may include read-only memory, random access memory, or both. In some examples, the memory 76 may be employed as active or physical memory by one or more executing software modules.

The storage device(s) 78 may be configured to provide (e.g., persistent) mass storage for the system 72 and may provide a database (e.g., data repository). In certain embodiments, the storage device(s) 78 may include one or more computer-readable media. For example, the storage device(s) 78 may include a floppy disk device, a hard disk device, an optical disk device, or a tape device. The storage device(s) 78 may include read-only memory, random access memory, or both. The storage device(s) 78 may include one or more of an internal hard drive, an external hard drive, or a removable drive.

One or both of the memory 76 or the storage device(s) 78 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 72. In certain embodiments, the CRSM may include a data store that provides storage of computer-readable instructions or other information in a non-transitory format. The CRSM may be incorporated into the system 72 or may be external with respect to the system 72. The CRSM may include read-only memory, random access memory, or both. One or more CRSM suitable for tangibly embodying computer program instructions and data may include any suitable type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 74 and the memory 76 may be supplemented by, or incorporated into, one or more application-specific integrated circuits (ASICs).

The system 72 may include one or more I/O devices 82. The I/O device(s) 82 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 82 may also include one or more output devices such as a display, LED(s), an audio output device (e.g., a speaker), a printer, a haptic output device, and so forth. The I/O device(s) 82 may be physically incorporated in one or more computing devices of the system 72, or may be external with respect to one or more computing devices of the system 72.

The system 72 may include one or more I/O interfaces 80 to enable components or modules of the system 72 to control, interface with, or otherwise communicate with the I/O device(s) 82. The I/O interface(s) 80 may enable information to be transferred in or out of the system 72, or between components of the system 72, through serial communication, parallel communication, or other types of communication. For example, the I/O interface(s) 80 may comply with a version of the RS-232 standard for serial ports, or with a version of the IEEE 1284 standard for parallel ports. As another example, the I/O interface(s) 80 may be configured to provide a connection over Universal Serial Bus (USB) or Ethernet. In some examples, the I/O interface(s) 80 may be configured to provide a serial connection that is compliant with a version of the IEEE 1394 standard.

The I/O interface(s) 80 may also include one or more network interfaces that enable communications between computing devices in the system 72, and/or between the system 72 and other network-connected computing systems. The network interface(s) may include one or more network interface controllers (NICs) or other types of transceiver devices configured to send and receive communications over one or more networks using any suitable network protocol.

Computing devices of the system 72 may communicate with one another, or with other computing devices, using one or more networks. Such networks may include public networks such as the internet, private networks such as an institutional or personal intranet, or any combination of private and public networks. The networks may include any suitable type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 72 may include one or more computing devices of any suitable type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Certain embodiments and all of the functional operations described in this specification may be realized in digital electronic circuitry, or in computer software, firmware, or hardware, including the structures disclosed in this specification and their structural equivalents, or in combinations of one or more of them. Certain embodiments may be realized as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and/or processor(s) of any appropriate kind of digital computer. Generally, a processor may receive instructions and data from a read only memory or a random-access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, certain embodiments may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Certain embodiments may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The techniques disclosed herein provide efficient ways to provide enhanced security given increases in electronic data available to accurately identify users (e.g., some users may have or eventually have tens, hundreds, thousands, or more credentials/factors that can be used for authentication). For example, environmental data, photographic images, biometric data, locations, activities, conditions, behaviors, and more may be collected and stored, and the techniques disclosed herein create unique, variable combinations of authentication factors to authenticate users. While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An authentication system, comprising:
one or more processors; and
a memory storing instructions executable by the one or more processors to cause the one or more processors to:
receive a first request for an electronic data action from a user device associated with a user;
select one or more first authentication factors from a plurality of available authentication factors based on a rotation schedule, a random selection, a prior location of the user, a prior activity of the user, or any combination thereof;
instruct output of one or more first prompts to facilitate input of the one or more first authentication factors;
receive one or more first inputs indicative of the one or more first authentication factors;
authenticate the user based on the one or more first inputs;
grant the first request in response to authenticating the user;
receive a second request for the electronic data action from the user device associated with the user, wherein the first request and the second request are received at different times;
select one or more second authentication factors from the plurality of available authentication factors, wherein at least one of the one or more second authentication factors is different from at least one of the one or more first authentication factors;
instruct output of one or more second prompts to facilitate input of the one or more second authentication factors;
receive one or more second inputs indicative of the one or more second authentication factors;
authenticate the user based on the one or more second inputs; and
grant the second request in response to authenticating the user.

2. The authentication system of claim 1, wherein the instructions are executable by the one or more processors to cause the one or more processors to select the one or more first authentication factors from the plurality of available authentication factors based on the rotation schedule.

3. The authentication system of claim 2, wherein the rotation schedule is set by the user during a registration process.

4. The authentication system of claim 1, wherein the instructions are executable by the one or more processors to cause the one or more processors to select the one or more first authentication factors from the plurality of available authentication factors based on the prior location of the user, the prior activity of the user, or both.

5. The authentication system of claim 1, wherein the instructions are executable by the one or more processors to cause the one or more processors to select the one or more second authentication factors from the plurality of available authentication factors based on the rotation schedule, the random selection, the prior location of the user, the prior activity of the user, or any combination thereof.

6. The authentication system of claim 1, wherein the one or more first authentication factors comprise a photograph, biometric data, a keyed input, a verbal input, or any combination thereof.

7. The authentication system of claim 1, wherein the one or more first authentication factors comprise a photograph taken with a camera of the user device.

8. The authentication system of claim 1, wherein the instructions are executable by the one or more processors to cause the one or more processors to present financial records on a display screen of the user device, another device, or both to grant the first request in response to authenticating the user.

9. The authentication system of claim 1, wherein the one or more first inputs indicative of the one or more first authentication factors comprise verifiable credentials stored on a blockchain.

10. An authentication system, comprising:
one or more processors; and
a memory storing instructions executable by the one or more processors to cause the one or more processors to:
access a rotation schedule that sets a first category of authentication factors for a first time period and a second category of authentication factors for a second time period;
receive, during the first time period, a first request for an electronic data action from a user device associated with a user;
select one or more first authentication factors from a plurality of available authentication factors based on the first request and the rotation schedule, wherein the one or more first authentication factors belong to the first category of authentication factors;
instruct output of one or more first prompts to facilitate input of the one or more first authentication factors;
receive one or more first inputs indicative of the one or more first authentication factors;
authenticate the user based on the one or more first inputs;
grant the first request in response to authenticating the user;
receive, during the second time period, a second request for the electronic data action from the user device associated with the user;
select one or more second authentication factors from the plurality of available authentication factors based on the second request and the rotation schedule, wherein the one or more second authentication factors belong to the second category of authentication factors;
instruct output of one or more second prompts to facilitate input of the one or more second authentication factors;
receive one or more second inputs indicative of the one or more second authentication factors;
authenticate the user based on the one or more second inputs; and
grant the second request in response to authenticating the user.

11. The authentication system of claim 10, wherein the instructions are executable by the one or more processors to cause the one or more processors to select the one or more first authentication factors from the plurality of available authentication factors based on the rotation schedule and one of an auxiliary device detected to be in proximity of the user device, a prior location of the user, or a prior activity of the user.

12. The authentication system of claim 10, wherein the first category comprises a photograph and the second category comprises biometric data.

13. The authentication system of claim 10, wherein the one or more first authentication factors comprise a photograph taken with a camera of the user device.

14. The authentication system of claim 10, wherein the rotation schedule is personalized for the user.

15. The authentication system of claim 10, wherein the instructions are executable by the one or more processors to cause the one or more processors to:
select the one or more first authentication factors from the plurality of available authentication factors based on the first request, the rotation schedule, and an auxiliary device detected to be in proximity of the user device.

16. A method of operating an authentication system, the method comprising:
receiving, at one or more processors, a first request for an electronic data action from a user device associated with a user;
selecting, using the one or more processors, one or more first authentication factors from a plurality of available authentication factors based on a rotation schedule, a random selection, a prior location of the user, a prior activity of the user, or any combination thereof;
instructing, using the one or more processors, output of one or more first prompts to facilitate input of the one or more first authentication factors;
receiving, at the one or more processors, one or more first inputs indicative of the one or more first authentication factors;
authenticating, using the one or more processors, the user based on the one or more first inputs;
granting, using the one or more processors, the first request in response to authenticating the user;
receiving, at the one or more processors, a second request for the electronic data action from the user device associated with the user, wherein the first request and the second request are received at different times;
selecting, using the one or more processors, one or more second authentication factors from the plurality of available authentication factors, wherein at least one of the one or more second authentication factors is different from at least one of the one or more first authentication factors;
instructing, using the one or more processors, output of one or more second prompts to facilitate input of the one or more second authentication factors;
receiving, using the one or more processors, one or more second inputs indicative of the one or more second authentication factors;
authenticating, using the one or more processors, the user based on the one or more second inputs; and
granting, using the one or more processors, the second request in response to authenticating the user.

17. The method of claim 16, comprising:
receiving, at the one or more processors, a user input indicative the rotation schedule; and
selecting, using the one or more processors, the one or more first authentication factors from the plurality of available authentication factors based on the rotation schedule.

18. The method of claim 16, comprising selecting, using the one or more processors, the one or more first authentication factors from the plurality of available authentication factors based on the prior location of the user, the prior activity of the user, or both.

* * * * *